(12) United States Patent
Roberts et al.

(10) Patent No.: US 7,311,165 B2
(45) Date of Patent: Dec. 25, 2007

(54) SNOWMOBILE SKI

(75) Inventors: Allen Roberts, Idaho Falls, ID (US); Joseph Brigham Hokanson, Idaho Falls, ID (US)

(73) Assignee: Starting Line Products, Inc., Idaho Falls, ID (US)

( * ) Notice: Subject to any disclaimer, the term of this patent is extended or adjusted under 35 U.S.C. 154(b) by 0 days.

(21) Appl. No.: 11/251,974

(22) Filed: Oct. 17, 2005

(65) Prior Publication Data

US 2006/0033294 A1 Feb. 16, 2006

Related U.S. Application Data

(63) Continuation of application No. 10/176,172, filed on Jun. 21, 2002, now Pat. No. 6,955,236.

(51) Int. Cl.
*B62M 29/00* (2006.01)

(52) U.S. Cl. ........................................ 180/182; 280/28

(58) Field of Classification Search ........ 280/608–610, 280/845, 11.18, 16, 21.1, 22, 22.1; 180/182
See application file for complete search history.

(56) References Cited

U.S. PATENT DOCUMENTS

| | | | |
|---|---|---|---|
| 2,593,025 A | 4/1952 | Hanson et al. | |
| 3,675,939 A | 7/1972 | Vik | |
| 3,870,331 A | 3/1975 | Cryderman | |
| 3,871,675 A | 3/1975 | Lund | |
| 3,968,958 A | 7/1976 | Huchette et al. | |
| 4,491,333 A | 1/1985 | Warnke | |
| 4,705,291 A * | 11/1987 | Gauer | 280/609 |
| 5,040,818 A | 8/1991 | Metheny | |
| 5,135,249 A | 8/1992 | Morris | |
| 5,145,195 A | 9/1992 | Campbell et al. | |
| 5,145,201 A | 9/1992 | Metheny | |
| 5,242,187 A * | 9/1993 | Diard et al. | 280/609 |
| 5,303,949 A | 4/1994 | Harper et al. | |
| 5,344,168 A | 9/1994 | Olson et al. | |
| D366,014 S | 1/1996 | Lindquist et al. | |
| D367,018 S | 2/1996 | Bernat | |
| 5,599,030 A | 2/1997 | Campbell et al. | |
| 5,700,020 A | 12/1997 | Noble | |

(Continued)

FOREIGN PATENT DOCUMENTS

CA 2378638 8/2002

(Continued)

OTHER PUBLICATIONS

Letter dated Apr. 13, 2007, from Kevin W. Metheny, President/CEO of Ultimate Sports Inc. (USI) to Bradley B. Jensen of TraskBritt, regarding Infringement Analysis of USI Snowmobile Skis in relation to Starting Line Products Patents 6,955,236, 6,991,056 and Patent Pending Applications (3 pages).

(Continued)

*Primary Examiner*—Tony Winner
(74) *Attorney, Agent, or Firm*—TraskBritt

(57) ABSTRACT

A snowmobile ski with a pair of outboard keels and laterally projecting, upwardly slanting, lateral wings attached proximate the outboard keels is disclosed. A ski of this structure has improved flotation and resistance to side slippage in turns.

15 Claims, 4 Drawing Sheets

U.S. PATENT DOCUMENTS

| | | |
|---|---|---|
| D408,759 S | 4/1999 | Chapdelaine |
| 6,012,728 A | 1/2000 | Noble |
| 6,105,979 A | 8/2000 | Desrochers |
| 6,267,392 B1 | 7/2001 | Noble |
| 6,378,889 B1 | 4/2002 | Moriyama et al. |
| 6,431,561 B1 | 8/2002 | Hedlund |
| 6,520,512 B1 | 2/2003 | Lachance |
| 6,619,676 B2 | 9/2003 | Cormican |
| D484,072 S | 12/2003 | Bruns |
| 6,955,236 B2 * | 10/2005 | Roberts et al. ............ 180/182 |
| 6,991,056 B2 | 1/2006 | Roberts et al. |
| D514,980 S | 2/2006 | Kukkonen |
| D539,189 S | 3/2007 | Huntimer et al. |
| 2003/0034619 A1 | 2/2003 | Bergstrom |
| 2003/0234129 A1 | 12/2003 | Roberts et al. |
| 2004/0061296 A1 | 4/2004 | Metheny |

FOREIGN PATENT DOCUMENTS

| | | |
|---|---|---|
| FR | 2662610 A1 | 12/1991 |

OTHER PUBLICATIONS

USI SKi Cross Sections from 1988 to 2007 (10 pages).

Additional Facts Relating to Materials Submitted by Ultimate Sports Inc. ("USI") (1 page).

* cited by examiner

SNOWMOBILE SKI

CROSS-REFERENCE TO RELATED APPLICATIONS

This application is a continuation of application Ser. No. 10/176,172, filed Jun. 21, 2002, now U.S. Pat. No. 6,955,236, issued Oct. 18, 2005, which is related to application Ser. No. 10/177,393 also filed Jun. 21, 2002, now U.S. pat. No. 6,991, 056, issued Jan. 31, 2006, the disclosures of each of which are incorporated herein by reference in their entireties.

BACKGROUND OF THE INVENTION

1. Field

This invention relates to snowmobile skis and in particular to snowmobile skis which are versatile, being useful on ice, hard-packed snow or in deep, powdery snow.

2. State of the Art

Snowmobile skis have undergone considerable evolution in recent years. Traditionally, metal skis had been utilized for decades until the recent development of plastic skis. Also, skis have gone from being essentially flat to having a curved or rocker shape as illustrated and claimed in various U.S. Patents to Noble, namely, U.S. Pat. Nos. 5,700,020; 6,012,728 and 6,267,392. The latter two patents also introduced the concept of having a plurality of keels and especially a tri-keel design wherein there is a central longitudinal keel which is deeper than two outboard keels. The advantage of this triple keel design is that it permits the skis to be more versatile, giving traditional steering control on hard surfaces, for example, ice, via the central keel, and then in deeper snow where the outboard keels take over some of the function of the central keel in permitting easy, straight-ahead steering and providing better control in turns, especially in deeper snow.

U.S. Pat. No. 4,491,333 to Warnke discloses a flat ski with flared flat running surface extensions to maximize ski flotation in deep snow. These flat wings are an extension of the ski running surface in that the margins of the ski are flared upward at an angle of 30° to 60° to the snow surface. The patent states that better lift is achieved in turns in deep snow without affecting the characteristics of the skis when run on hard-packed snow. The flared ski margins serve to increase the effective width of the skis.

Snowmobiles have a long extended track which tends to cause the snowmobile to proceed along the longitudinal axis of the track even in a turn. The long track is rapidly moving and it tends to propel the snowmobile straight ahead even when the skis are turned, thus there is a plowing action of the skis in turns. Skis having some vertical surface area, such as provided by the three keels, militate to some extent against the sideways or lateral motion of turned skis. The snowmobile steering mechanism is structured with a camber so that when the snowmobile skis are turned the skis tilt away from a flat, running aspect. The straight-ahead, plowing effect may be pronounced in deep snow at any speed where the snow is very powdery and light such as that found frequently in the western United States.

BRIEF SUMMARY OF THE INVENTION

This invention relates to snowmobile skis which have one or more lateral wings extending along at least one lateral edge of the skis for a substantial length, preferably substantially coextensive with the length of the lower running surface of the ski. These wings generally do not extend around the tip of the ski. The wings may be planar in nature or the wings may have a longitudinal arcuate shape and also a lateral arcuate shape to form a compact curved wing to provide better floatation for the ski in deep snow and to resist side slippage during turns in the snow. The snowmobile skis to which these wings find greatest applicability are those which have outboard keels such as those illustrated in U.S. Pat. Nos. 5,700,020; 6,012,728 and 6,267,392 B1 to Noble. The wings are at least partially elevated with respect to the conventional lower running surface of the skis and form a raised running surface which provides additional lift or flotation in deep snow.

BRIEF DESCRIPTION OF THE SEVERAL VIEWS OF THE DRAWINGS

In the drawings, which illustrate what is currently considered to be the best mode for carrying out the invention.

DETAILED DESCRIPTION OF THE INVENTION

In companion U.S. Pat. No. 6,991,056, issued Jan. 31, 2006, filed on the same date as this application, the specification of which is incorporated herein by reference, skis are described which have a top side fin which is substantially vertical and which has over-curved upper edges in preferred structures which form a lip and provide better floatation for the skis. In this application, the invention relates to skis having wings which are an extension of the running surface of the ski although the wings do provide an elevated surface which is generally not in contact with the snow when the skis are running on a hard-packed surface. Planar-type wings described herein are preferably incorporated in skis with outboard keels while longitudinally arcuate wings may also be advantageously incorporated on skis with only a central keel.

Figure 1:
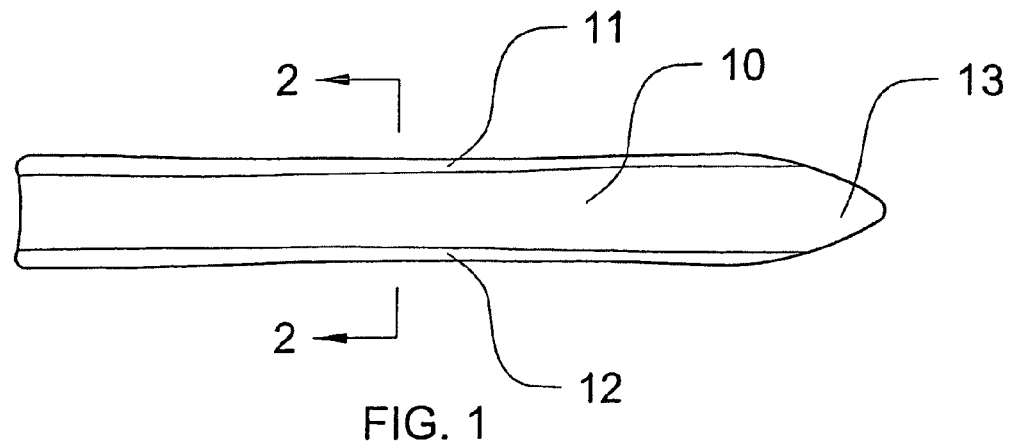
FIG. 1 is a plan top view of a snowmobile ski having a pair of lateral parallel wings along each longitudinal outer edge of the ski.
Figure 2:
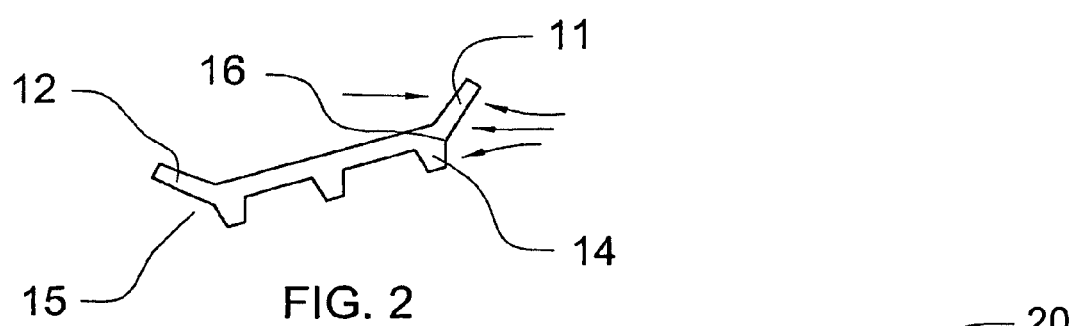
FIG. 2 is a cross-sectional view of the ski of FIG. 1 along section lines 2—2.

Referring now to FIGS. 1 and 2, the unique coaction of a wing with an outboard keel of the ski is illustrated and described. FIG. 1 is a plan top view of a ski 10 having lateral parallel wing members 11 and 12 along each edge of the ski wherein the wing members 11 and 12 merge into the tip 13 of the ski so that the maximum width of the ski tip is substantially the same as the maximum width of the ski measured from the outboard edge of one wing member (e.g., 11) to the outboard edge of the wing member (e.g. 12) on the opposite side of the ski. The wing members 11 and 12 may generally be in width from about one-half inch up to about three inches. A wing member width of about one to two inches is generally preferred. The coaction of a wing member 11 or 12 with an outboard keel member 14 is illustrated in FIG. 2 which is a view along section lines 2—2 of FIG. 1.

As seen in FIG. 2, when the ski is in a turn, it is tilted slightly with the inboard edge 15 of the ski then being lower than the outboard edge 16 due to the camber built into the steering system of the skis. The wing member 11 is shown attached and being a projection from the outer edge of the ski adjacent the top of the outboard keel member 14 and angled in this illustration at an angle of about 45°. Generally, the tilt provided by the camber of the steering system is about 5 to 8°. As can be seen, this means that at a camber of 5° the tilt of the wing member 11 to a horizontal surface is about 50°. Thus, both the wing member 11 and the keel member 14 both press in an outward direction against the snow to prevent any side slippage. However, inasmuch as the ski is tilted, the outboard keel member 14 presses against the snow to densify it to some extent so that improved floatation is provided to the wing member 11 since the wing member 11 is now riding on snow that is densified. Some snow may tend to overflow the top edge of the wing member 11, while some snow may flow under the outboard keel member 14. However, the total surface area provided by the keel and wing greatly minimizes side slippage and provides improved flotation. The curved arrows show the flow of snow over and under the wing and keel.

Figure 3:
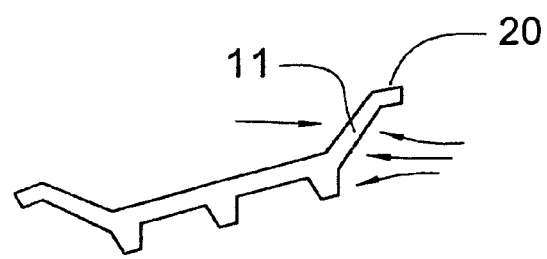
FIG. 3 illustrates a variation of a ski wherein the ski, similar to FIGS. 1 and 2, has parallel lateral ring members which additionally have outwardly projecting lips coextensive with the outer edges of the wing members.

FIG. 3 illustrates a slight variation of the cross-sectional view of FIG. 2 wherein the elongated, planar wing member 11 has an outwardly projecting lip 20, which may be coextensive in length with the wing member 11. The lip 20, as illustrated, projects outwardly to be essentially parallel to a typically horizontal snow surface. Such a lateral projecting lip 20 provides additional lift and resistance to side slippage in a turn.

As can been seen in FIG. 3, the combination of the keel, the wing member and the lip, effectively minimize snow sliding under the ski and from overflowing the wing member.

Figure 4:
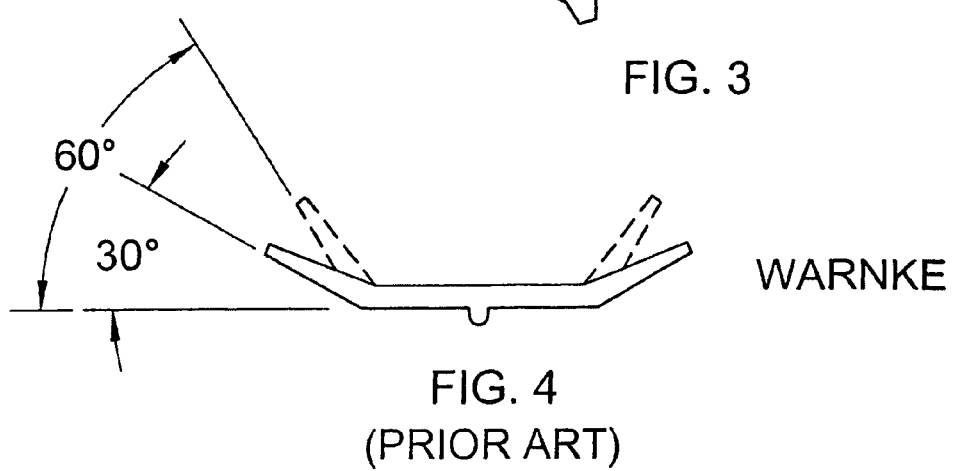
FIG. 4 is a cross-sectional view of Prior Art illustrated in Warnke.

A cross-sectional view of the Prior Art ski of Warnke is illustrated in FIG. 4 wherein a pair of planar wing members are shown attached to an essentially flat ski so that the wing members slant upwardly at a preferred angle of between 30° and 60°. The absence of outboard keel members allows the ski to slide sideways in a turn to a much greater extent than the skis of the instant invention wherein coaction of the keel with the wing member provides improved resistance to side slippage and flotation.

The upturned outboard wing of a Warnke ski during a turn may assist the ski in sliding sideways while the opposed wing of the inboard side of the ski also provides a sideways sliding surface. Warnke-type skis have not been commercially utilized for at least the last ten years and may never have been commercialized or at least ever became a significant product in the snowmobile industry.

Figure 5:
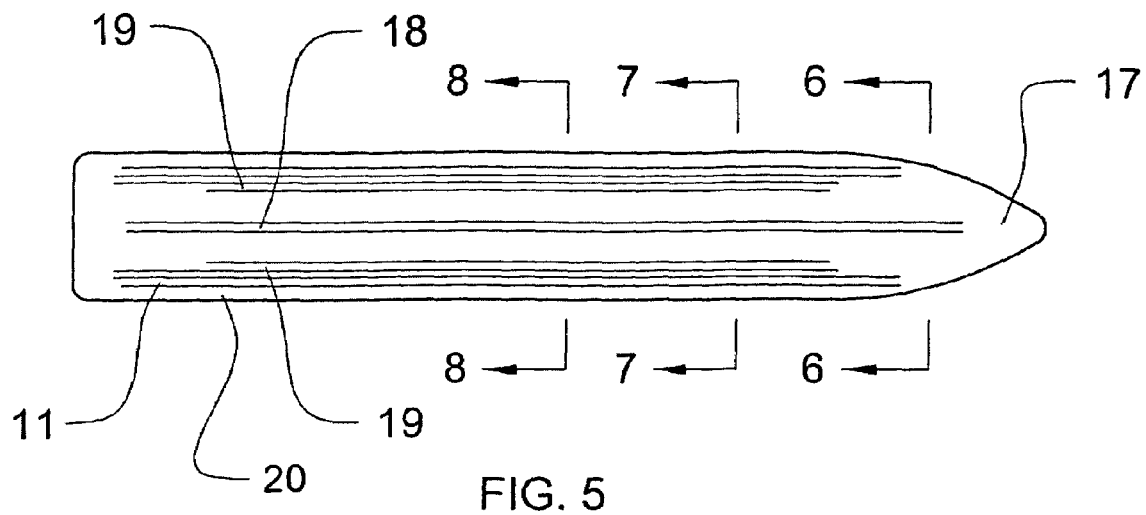
FIG. 5 is a plan view of the bottom of a tri-keel ski with parallel lateral wing members.
Figure 6:
FIG. 6 is a cross-sectional view of the ski of FIG. 5 along section lines 6—6.
Figure 7:
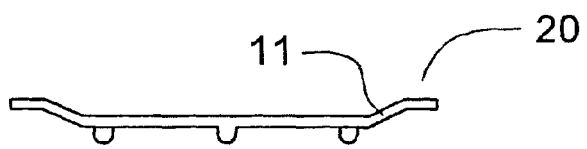
FIG. 7 is a cross-sectional view of the ski of FIG. 5 along section lines 7—7.
Figure 8:
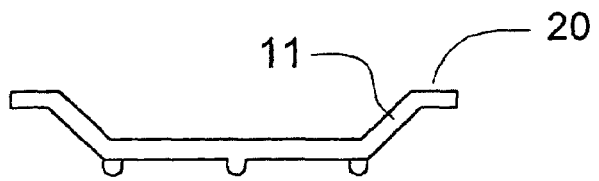
FIG. 8 is a cross-sectional view of the ski of FIG. 5 along section lines 8—8.

In a preferred embodiment of the ski, the wing has a varying angle depending upon the longitudinal location on the ski of that portion of the wing. For example, the wing member 11 adjacent the area or region where the wing blends into the base of the tip 17 of the ski may be at an angle of only a few degrees with the angle of the wing increasing in steepness as it approaches the midpoint of the ski and then decreasing in steepness until at the tail of the ski the wing essentially is at a zero angle to a horizontal surface. As the steepness of the angle of the wing increases, the width of the wing preferably increases so that a substantially uniformly wide ski is constructed with the width being measured from the outer edge of one wing to the outer edge of another. Such a ski may be seen from FIGS. 5, 6, 7 and 8, wherein FIG. 5 is a plan view of the bottom of the ski showing a center keel 18 and two smaller outboard keels 19 and a wing member 11 with projecting lip 20 on each side of the ski. FIG. 6 is a sectional view along sections lines 6—6 of FIG. 5 showing essentially no angle close to the joinder of the wing at the base of the tip of the ski. FIG. 7 is a cross-sectional view along section lines 7—7 of FIG. 5 at about the quarter length of the ski while FIG. 8 is a cross-sectional view approximating the midpoint of the ski. The cross-sectional view at the three-quarter length of the ski and near the tail of the ski is similar to FIGS. 7 and 6, respectively. FIGS. 5, 7 and 8 all show an outwardly projecting lip 20 along the upper edge of wing member 11.

As can be seen from these figures, the wing starts at a very shallow angle and then increases in steepness until at about the midpoint of the ski the angle of the wing may be upwards of about 65° or even more if desired. This type of construction provides most of the resistance to side slippage and lift generally near the central portion of the ski so that the steering remains essentially neutral. The gradual increase of the angle of the wing permits the ski when running forward in an essentially straight direction to have the snow gradually introduced under the wing so that there are no abrupt edges or changes in conformity of the ski. Such a ski glides smoothly over the snow surface or through the snow if the skis are running in deeper snow.

Figure 9:
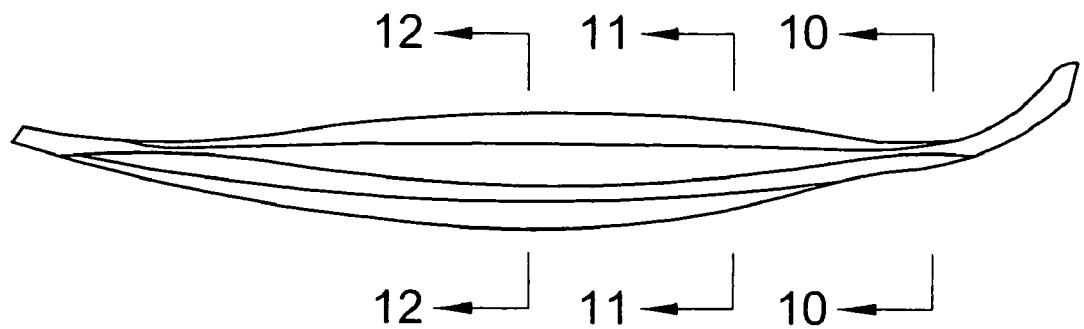
FIG. 9 is an elevational side view of a snowmobile ski illustrating a lateral wing member which has a shallow angle both fore and aft and which angle increases toward the central region of the ski to a maximum near the longitudinal midpoint of the ski.

A further shape of the wing is shown in FIG. 9, which is an elevational side view when the angle starts in a shallow manner and then increases to a maximum near the midpoint of the ski. However, the surface of the wing begins a gradual curve-over as it proceeds from the front portion of the ski to about the midportion and then continues this curve-over toward the rear of the ski with the angle decreasing and the curve-over decreasing as well. This may be shown in FIGS. 10, 11, and 12, which are section lines along the front of the ski near the ski running surface-top merge approximate one-quarter mark of the ski and further near the midpoint of the ski. This lateral over-curvature generally gives the wing member an arcuate shape both longitudinally and laterally to provide a concave surface which is concave longitudinally and laterally throughout a significant portion of the wing member, particularly that portion which is located near the midpoint of the ski and may have a significant lateral curvature from about the one-quarter mark to the three-quarter mark of the ski.

Figure 10:
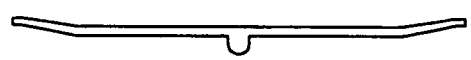
FIG. 10 is a cross-sectional view of the ski of FIG. 9 along section lines 9—9.
Figure 11:
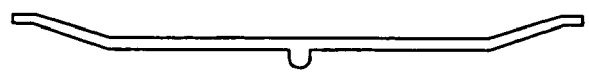
FIG. 11 is a cross-sectional view of the ski of FIG. 9 along section lines 10—10.
Figure 12:
FIG. 12 is a cross-sectional view of the ski of FIG. 9 along section lines 12—12.

FIG. 10 is a cross-sectional view along section lines 10—10 of FIG. 9, while FIG. 11 is a cross-sectional view along section lines 11—11 of FIG. 9, and FIG. 12 is a cross-sectional view along section lines 12—12 of FIG. 9 and wherein the steepest angle of the wing member occurs and wherein the outer edge of the wing has evolved into a curved-over lip.

The inventive structure described herein provides good resistance to side slippage and also excellent floatation when the skis are running forward in a straight line through deep snow and also when the skis are being turned in deep snow. Also the structure does not provide any significant lateral extensions of the ski which interfere with the steering and running of the skis when on hard-packed surfaces. These skis have a lower running surface which is effective for running and steering on hard-packed surfaces and then additionally an upper running surface provided by the wing members, preferably of a concave configuration, which are generally elevated above hard-packed snow but interact with deeper snow to provide floatation and excellent steering characteristics for the ski.

The wing members, as described hereinabove, are especially effective when incorporated with skis which have outboard keels. However, the wing members which have a lateral over-curve and which have a generally arcuate shape longitudinally may be effectively used for skis without outboard keels.

Generally it is preferred that the forces upon a ski be balanced both during forward running and during turns. If the floatation of the ski is such that the tip of the ski rides high, then the ski has a steep angle when running forward and is pushing snow before it, which is an inefficient manner of running. Preferably, the skis in a forward running direction, are planing which is the situation when the ski is at essentially a zero angle or close to a zero angle longitudinally to a horizontal surface.

When skis are turned, if the lateral forces on the ski are not uniform, for example, if there is more lateral force at the front end of the ski, the ski will tend to cause the snowmobile to over-steer causing the turns to become too sharp, thereby risking overturning of the snowmobile. If the forces at the tail of the ski in a turn are laterally directed and unbalanced, i.e., are not equal to the forces on the front of the ski, then the steering can be very stiff and appropriately sharp turns may be difficult to make. Thus, in design and structure, the skis of this invention are generally configured so that the lateral forces and the lifting forces on the ski provided by the wings are at about their maximum near the central region of the ski and are otherwise balanced between the rear portion and forward portion of a ski.

Figure 13:
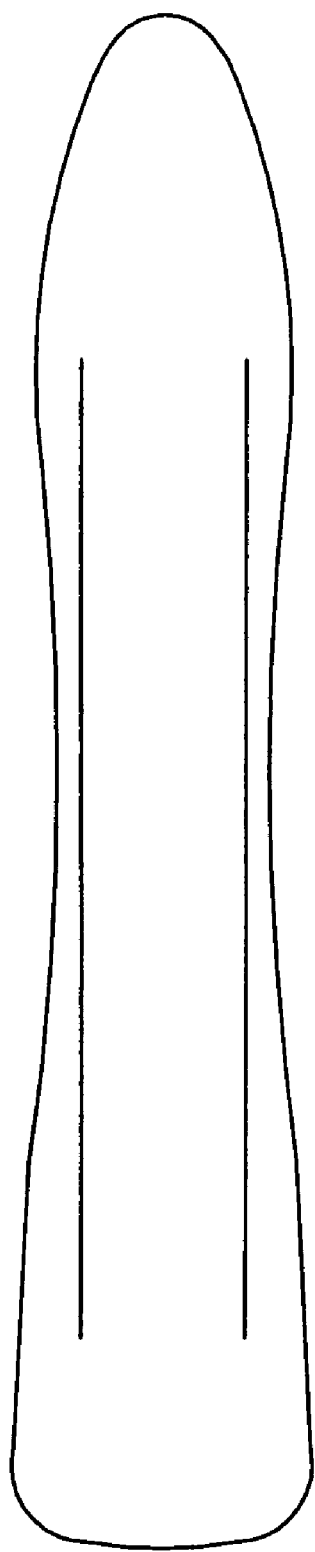
FIG. 13 is a plan top view of a snowmobile ski wherein the raised lateral outer edge of the wing members conforms to a generally parabolic shape.

In FIG. 13, a ski is illustrated in a plan top view whereby the lateral edges of the skis form a generally parabolic shape. This configuration may provide some advantage in turns and is readily formable when wings of uniform width increase from a substantially zero angle at both the forward and rear portions of the ski to a steep angle near the central portion of the ski.

What is claimed is:

1. A snowmobile ski comprising:
   at least one outboard keel member along an outer edge of a running surface of the ski; and
   at least one elongated wing member projecting laterally outward and upward from a region proximate an upper, outboard portion of the at least one outboard keel member, a length of the at least one elongated wing member being substantially coextensive with the at least one outboard keel member, wherein the at least one elongated wing member includes a substantially elongated planar member having a relatively narrow lateral width as compared to a lateral width of the ski running surface, and wherein the at least one elongated wing member has a greater lateral width near a longitudinal midportion of the at least one elongated wing member than near fore or aft portions thereof with the lateral width of the at least one wing member gradually increasing from fore and aft directions towards the longitudinal midportion of the at least one elongated wing members.

2. The ski of claim 1, wherein an outer most edge of the wing exhibits a generally arcuate shape.

3. A snowmobile ski comprising:
   at least one keel forming part of a running surface, the running surface having opposed, outboard, elongated edges; and
   at least one elongated wing member attached to and projecting laterally outwardly from at least one of the elongated edges and having an upward angle of projection from the at least one elongated edge of the ski running surface wherein an upward angle of projection is less proximate fore and aft portions of the at least one elongated wing member than proximate a longitudinal midportion of the elongated wing member, and wherein the longitudinal midportion of the at least one elongated wing member is substantially proximate a longitudinal midportion of the ski, and wherein a width of the at least one elongated wing member is greater proximate the longitudinal midportion of the at least one elongated wing member than at fore or aft portions thereof.

4. The ski of claim 3, wherein an outer edge of at least a portion of the at least one elongated wing member has a generally arcuate shape.

5. The ski of claim 3, wherein at least a portion the at least one elongated wing member near the longitudinal midportion of the ski has a partial surface area which is substantially vertically oriented.

6. The ski of claim 3, wherein at least an upper portion of the at least one elongated wing member near the longitudinal midportion of the ski has a partial surface area which is substantially horizontal and substantially elevated above the running surface of the ski.

7. The ski of claim 3, wherein the at least one elongated wing member is substantially symmetrical about a lateral line proximate the longitudinal midportion of the at least one elongated wing member.

8. A snowmobile ski comprising:
   at least one outboard keel member forming part of a lower running surface of the ski; and
   at least one elongated wing member projecting laterally outward and upward from a region proximate an upper, outboard portion of the at least one outboard keel member, wherein the at least one elongated wing member projects upwardly at at least two different angles along its length and has a nonplanar lower surface, and wherein the at least one elongated wing member has a greater width near a longitudinal midportion of the at least one elongated wing member than near fore or aft portions thereof.

9. The ski of claim 8, wherein an outer edge of at least a portion of the at least one elongated wing member has a generally arcuate shape.

10. The ski of claim 8, wherein at least a portion the at least one elongated wing member near the longitudinal midportion of the ski has a partial surface area which is substantially vertically oriented.

11. The ski of claim 8, wherein at least an upper portion of the at least one elongated wing member near the longitudinal midportion of the ski has a partial surface area which is substantially horizontal and substantially elevated above the running surface of the ski.

12. The ski of claim 8, wherein the at least one elongated wing member is substantially symmetrical about a lateral line proximate the longitudinal midportion of the at least one elongated wing member.

13. The ski of claim 1, wherein at least a portion the at least one elongated wing member near the longitudinal midportion of the ski has a partial surface area which is substantially vertically oriented.

14. The ski of claim 1, wherein at least an upper portion of the at least one elongated wing member near the longitudinal midportion of the ski has a partial surface area which is substantially horizontal and substantially elevated above the running surface of the ski.

15. The ski of claim 1, wherein the at least one elongated wing member is substantially symmetrical about a lateral line proximate the longitudinal midportion of the at least one elongated wing member.

* * * * *